(No Model.)
S. G. HINDSLEY.
FLOOD GATE.
No. 538,832. Patented May 7, 1895.
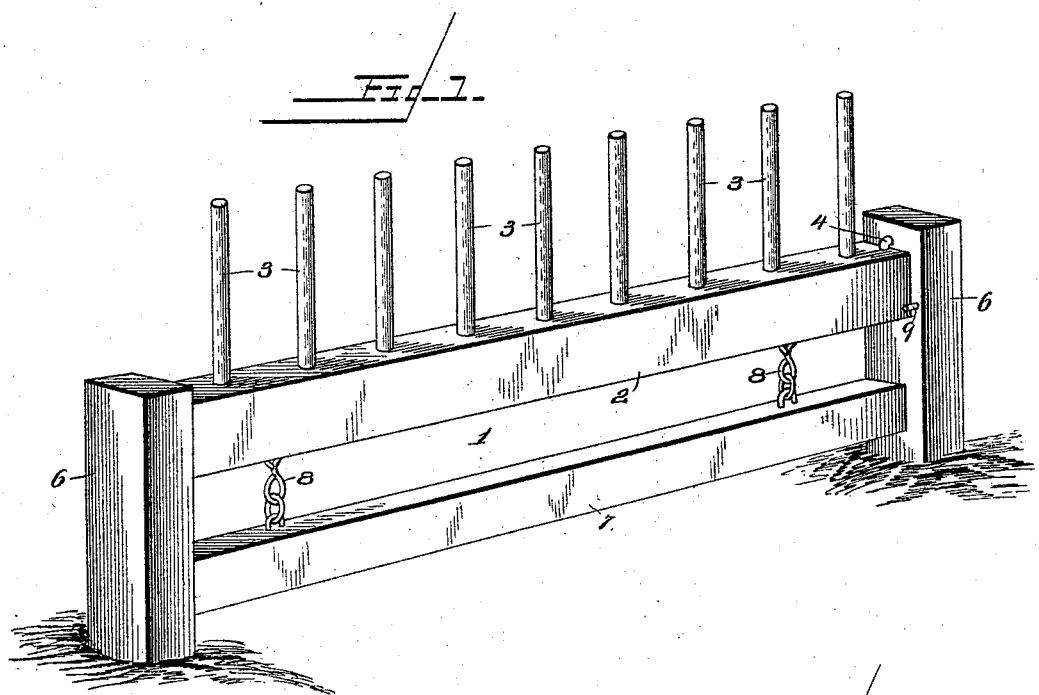
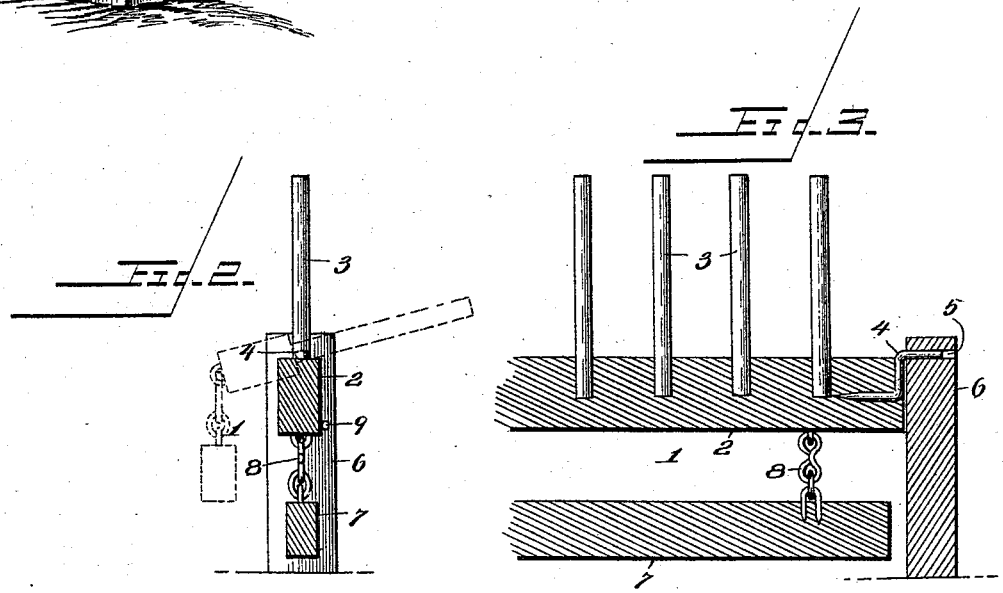
Inventor
Steven G. Hindsley.
Witnesses
Thos. W. Riley
J. F. Riley
By his Attorneys.
C. A. Snow & Co.

UNITED STATES PATENT OFFICE.

STEVEN G. HINDSLEY, OF UNION CITY, INDIANA.

FLOOD-GATE.

SPECIFICATION forming part of Letters Patent No. 538,832, dated May 7, 1895.

Application filed January 9, 1895. Serial No. 534,370. (No model.)

*To all whom it may concern:*

Be it known that I, STEVEN G. HINDSLEY, a citizen of the United States, residing at Union City, in the county of Randolph and State of Indiana, have invented a new and useful Flood-Gate, of which the following is a specification.

The invention relates to improvements in flood gates.

The object of the present invention is to improve the construction of flood gates, and to provide a simple and efficient one, which will possess great strength and durability, and which will be operative in both high and low water.

The invention consists in the construction and novel combination and arrangement of parts hereinafter fully described, illustrated in the accompanying drawings, and pointed out in the claims hereto appended.

In the drawings, Figure 1 is a perspective view of a flood-gate constructed in accordance with this invention. Fig. 2 is a transverse sectional view. Fig. 3 is a vertical sectional view of one end of the flood-gate, illustrating the manner of pivoting the same.

Like numerals of reference indicate corresponding parts in all the figures of the drawings.

1 designates a flood gate, comprising a horizontal bar 2, and a series of vertically disposed pickets 3, extending upward from the horizontal bar 2, and having their lower ends seated in suitable sockets thereof. The horizontal bar 2 is provided at the upper edges of its ends with pintles 4, fitting in bearing openings 5 of vertical posts 6, whereby the gate is pivotally mounted, and is adapted to have its pickets swung downward, to permit drift wood, ice, or the like, to pass it readily in going down stream. The posts 6 are designed to be driven in the ground at the banks of a stream, and the flood gate may be of any desired length, to suit the width of a stream, and the gate is maintained normally in proper position by a swinging horizontally disposed bar 7, connected loosely at opposite ends with the horizontal bar of the gate, by short chains 8. One, or both, of the posts may be provided with a projection 9, forming a stop, and located below the pintles or pivots, and holding the gate against rearward swing.

The gate may be constructed of any suitable material either wood or metal, and the swinging bar 7, which retains the gate normally in a vertical position, is adapted to prevent animals from passing under the gate in dry weather, and is arranged to permit drift wood, or other obstructions to pass it.

It will be seen that the flood gate is exceedingly simple and inexpensive in construction, and that it possesses great strength and durability, and that it may be made practically indestructible.

Changes in the form, proportion, and the minor details of construction may be resorted to without departing from the principle or sacrificing any of the advanges of this invention.

What I claim is—

1. The combination with suitable supports, of a gate pivotally mounted at its ends between the supports and projecting upward beyond its pivotal points, and a swinging bar located beneath the gate and suspended therefrom and maintaining the same normally in a vertical position, substantially as described.

2. The combination of posts, a gate comprising a horizontal bar pivoted at its ends between the posts and pickets extending upward from the horizontal bar, a swinging bar arranged in the space beneath the gate and loosely suspended from the horizontal bar thereof, and a stop projecting from one of the posts and arranged to be engaged by the gate and located below the pivotal point of the same, substantially as described.

In testimony that I claim the foregoing as my own I have hereto affixed my signature in the presence of two witnesses.

STEVEN G. HINDSLEY.

Witnesses:
JAMES PURCELL,
JAMES B. MCKENZIE.